(12) United States Patent
O'Brien et al.

(10) Patent No.: US 9,108,850 B2
(45) Date of Patent: Aug. 18, 2015

(54) PREPARING NANOPARTICLES AND CARBON NANOTUBES

(75) Inventors: Stephen O'Brien, New York, NY (US); Limin Huang, Jersey City, NJ (US); Brian Edward White, Walton, NY (US); Samuel Jonas Wind, White Plains, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 8 days.

(21) Appl. No.: 13/299,875

(22) Filed: Nov. 18, 2011

(65) Prior Publication Data

US 2012/0126199 A1    May 24, 2012

Related U.S. Application Data

(63) Continuation of application No. 12/246,758, which is a continuation-in-part of application No. PCT/US2007/008389, filed on Apr. 5, 2007, now abandoned.

(60) Provisional application No. 60/790,385, filed on Apr. 7, 2006.

(51) Int. Cl.
| | |
|---|---|
| *B05D 3/02* | (2006.01) |
| *C01B 31/02* | (2006.01) |
| *B82Y 30/00* | (2011.01) |
| *B82Y 40/00* | (2011.01) |

(52) U.S. Cl.
CPC ............ *C01B 31/0233* (2013.01); *B82Y 30/00* (2013.01); *B82Y 40/00* (2013.01); *C01B 2202/02* (2013.01); *C01B 2202/34* (2013.01); *C01B 2202/36* (2013.01); *Y10T 428/24802* (2015.01)

(58) Field of Classification Search
CPC ............ C01B 31/0233; C01B 2202/02; C01B 2202/34; C01B 2202/36; B82Y 30/00; B82Y 40/00
USPC ............ 427/256, 259, 282; 438/99, 669, 760; 257/24, 368
See application file for complete search history.

(56) References Cited

U.S. PATENT DOCUMENTS

| | | |
|---|---|---|
| 6,346,189 B1 | 2/2002 | Dai et al. |
| 6,764,874 B1 | 7/2004 | Zhang et al. |
| 2004/0105807 A1 | 6/2004 | Fan et al. |

(Continued)

FOREIGN PATENT DOCUMENTS

| | | |
|---|---|---|
| EP | 1462415 A2 | 9/2004 |
| WO | WO-2004000728 A1 | 12/2003 |

(Continued)

OTHER PUBLICATIONS

"U.S. Appl. No. 12/246,758, Advisory Action mailed Jun. 3, 2010", 4 pgs.

(Continued)

*Primary Examiner* — Xiao Zhao
(74) *Attorney, Agent, or Firm* — Schwegman Lundberg & Woessner, P.A.

(57) ABSTRACT

Apparatus and methods for forming the apparatus include nanoparticles, catalyst nanoparticles, carbon nanotubes generated from catalyst nanoparticles, and methods of fabrication of such nanoparticles and carbon nanotubes.

14 Claims, 6 Drawing Sheets

(56) References Cited

U.S. PATENT DOCUMENTS

| | | |
|---|---|---|
| 2004/0109814 A1* | 6/2004 | Simard et al. .............. 423/447.1 |
| 2005/0061249 A1 | 3/2005 | Miyahara et al. |
| 2005/0170089 A1 | 8/2005 | Lashmore et al. |
| 2005/0260453 A1* | 11/2005 | Jiao et al. ...................... 428/698 |
| 2006/0038179 A1 | 2/2006 | Afzali-Ardakani et al. |
| 2006/0067871 A1 | 3/2006 | Hart et al. |
| 2006/0140868 A1 | 6/2006 | Grancharov et al. |
| 2007/0048790 A1 | 3/2007 | Sheetz et al. |
| 2007/0059645 A1 | 3/2007 | Tang et al. |
| 2007/0059775 A1 | 3/2007 | Hultman et al. |
| 2007/0140951 A1 | 6/2007 | O'Brien et al. |
| 2008/0003615 A1 | 1/2008 | Sheetz et al. |
| 2008/0069760 A1 | 3/2008 | O'Brien et al. |
| 2008/0159943 A1* | 7/2008 | Gu et al. ................... 423/445 B |
| 2009/0075035 A1 | 3/2009 | O'Brien et al. |

FOREIGN PATENT DOCUMENTS

| | | |
|---|---|---|
| WO | WO-2007117503 A2 | 10/2007 |
| WO | WO-2007117503 A3 | 10/2007 |

OTHER PUBLICATIONS

"U.S. Appl. No. 12/246,758, Final Office Action mailed Jan. 12, 2011", 10 pgs.

"U.S. Appl. No. 12/246,758, Final Office Action mailed Mar. 23, 2010", 9 pgs.

"U.S. Appl. No. 12/246,758, Non Final Office Action mailed May 18, 2011", 12 pgs.

"U.S. Appl. No. 12/246,758, Non-Final Office Action mailed Jul. 1, 2010", 11 pgs.

"U.S. Appl. No. 12/246,758, Non-Final Office Action mailed Aug. 14, 2009", 11 Pgs.

"U.S. Appl. No. 12/246,758, Response filed Apr. 12, 2011 to Final Office Action mailed Jan. 12, 2011", 10 pgs.

"U.S. Appl. No. 12/246,758, Response filed May 21, 2010 to Final Office Action mailed Mar. 23, 2010", 11 pgs.

"U.S. Appl. No. 12/246,758, Response Filed Jan. 14, 2010 to Non-Final Office Action mailed Aug. 14, 2009", 13 pgs.

"U.S. Appl. No. 12/246,758, Response filed Nov. 30, 2010 to Non Final Office Action mailed Jul. 1, 2010", 12 pgs.

"U.S. Appl. No. 12/246,758, Restriction Requirement mailed May 11, 2009", 7 pgs.

"U.S. Appl. No. 12/246,758,Response filed Jun. 11, 2009 to Restriction Requirement mailed May 11, 2009", 6 pgs.

"International Application Serial No. PCT/US2007/008389, Search Report mailed Mar. 19, 2008", 4 pgs.

"International Application Serial No. PCT/US2007/008389, Written Opinon mailed Mar. 19, 2008", 8 pgs.

Appenzeller, J, et al., "Carbon nanotubes as potential building blocks for future nanoelectronics", Microelectronic Engineering, 64(1), (Aug. 6, 2002), 391-397.

Banerjee, Sarbajit, et al., "Controlled Dielectrophoretic Positioning of Carbon Nanotubes", American Physical Society, March Meeting, Session U31: Nanotubes, Experiment, (Mar. 16, 2006), 1 pg.

Banerjee, Sarbajit, et al., "Controlling the dielectrophoretic assembly of single-walled carbon nanotubes", American Physiological Society, March Meeting, Session X31: Synthesis of Nanotubes and Nanowires, (Mar. 5, 2007), 1 pg.

Banerjee, Sarbajit, et al., "Precise positioning of single-walled carbon nanotubes by ac dielectrophoresis", The Journal of Vacuum Science and Technology B, 24(6), (Dec. 4, 2006), 3173-3178.

Chen, Zhihong, et al., "An Integrated Logic Circuit Assembled on a Single Carbon Nanotube", Science, 311, (Mar. 24, 2006), p. 1735.

De Poortere, E P, et al., "1 to 2-nm-wide nanogaps fabricated with single-walled carbon nanotube shadow masks", Journal of Vacuum Science Technology B, 24(6), (Dec. 4, 2006), 3213-3216.

De Poortere, E P, et al., "Single-Walled Carbon Nanotubes as Shadow Masks for Nanogap Junction Fabrication", Applied Physics Letters, 88, (Apr. 6, 2006), 1-4.

Guo, Xuefeng, et al., "Covalently Bridging Gaps in Single-Walled Carbon Nanotubes with Conducting Molecules", Science, 311, (Jan. 20, 2006), 356-359.

Guo, Xuefeng, et al., "Directing and Sensing Changes in Molecular Conformation on Individual Carbon Nanotube Field Effect Transistors", Journal of the American Chemical Society, 127(43), (Nov. 2, 2005), 15045-15047.

Hata, K., et al., "Water-Assisted Highly Efficient Synthesis of Impurity-Free Single-Walled Carbon Nanotubes", Science, 306, (Nov. 19, 2004), 1362-1364.

Huang, Limin, et al., "Barium Titanate Nanocrystals and Nanocrystal Thin Films: Synthesis, Ferroelectricity, and Dielectric Properties", Journal of Applied Physiology 100, 034316, (Aug. 10, 2006), 9 pgs.

Huang, Limin, et al., "Cobalt Ultrathin Film Catalyzed Ethanol Chemical Vapor Deposition of Single-Walled Carbon Nanotubes", Journal of Physiological Chemistry B, 110, (Mar. 27, 2006), 11103-11109.

Huang, Limin, et al., "Controlled Growth of Single-Walled Carbon Nanotubes from an Ordered Mesoporous Silica Template", Nano Letters, 3 (3), (Feb. 5, 2003), 299-303.

Huang, Limin, et al., "Long and Oriented Single-Walled Carbon Nanotubes Grown by Ethanol Chemical Vapor Deposition", The Journal of Physical Chemistry B, 108(43), (Sep. 29, 2004), 16451-16456.

Huang, Limin, et al., "Orientated Assembly of Single-Walled Carbon Nanotubes and Applications", Journal of Materials Chemistry, 17(37), (Jun. 18, 2007), 3863-3874.

Huang, Shaoming, et al., "Growth Mechanism of Oriented Long Single Walled Carbon Nanotubes Using 'Fast-Heating' Chemical Vapor Deposition Process", Nano Letters, 4(6), (May 1, 2004), 1025-1028.

Huang, Xue M. H., et al., "Controlled Placement of Individual Carbon Nanotubes", Nano Letters, 5(7), (Jun. 18, 2005), 1515-1518.

Krauss, Todd D, et al., "Charge and Photoionization Properties of Single Semiconductor Nanocrystals", The Journal of Physical Chemistry B, 105(9), (2001), 1725-1733.

O'Brien, Stephen, et al., "Adsorption Dynamics of Alkanes on Single-Wall Carbon Nanotubes: A Molecular Beam Scattering Study", The Journal of Physical Chemistry C, 111(22), (May 11, 2007), 8043-8049.

O'Brien, Stephen, et al., "Synthesis of Monodisperse Nanoparticles of Barium Titanate: Toward a Generalized Strategy of Oxide Nanoparticle Synthesis", Journal of the American Chemical Society, 123, (Nov. 7, 2001), 12085-12086.

Redi, F X, et al., "Three-dimensional binary superlattices of magnetic nanocrystals and semiconductor quantum dots", Nature, 423, (Jun. 26, 2003), 968-971.

Schauer, Mark W, et al., "Synthesis and Properties of Carbon Nanotube Yarns and Textiles", Materials Research Society, Spring meeting, Mar. 24-28, 1081-P03-05, (Mar. 2008), 1-6.

Sfeir, Matthew J, "Optical Spectroscopy of Individual Single-Walled Carbon Nanotubes of Defined Chiral Structure", Science, 312(5773), (Apr. 28, 2006), 554-556.

Sfeir, Matthew J, et al., "Probing Electronic Transitions in Individual Carbon Nanotubes by Rayleigh Scattering", Science, 306(5701), (Nov. 26, 2004), 1540-1543.

Shevchenko, Elena V, et al., "Structural Diversity in Binary Nanoparticle Superlattices", Nature, 439, (Jan. 5, 2006), 55-59.

Wang, Feng, et al., "Interactions between Individual Carbon Nanotubes Studied by Rayleigh Scattering Spectroscopy", Physical Review Letters, 96, (Apr. 28, 2006), 167401-1 through 167401-4.

White, Brian, et al., "Zeta-Potential Measurements of Surfactant-Wrapped Individual Single-Walled Carbon Nanotubes", The Journal of Physical Chemistry C, 111(37), (Jun. 2007), 13684-13690.

Wind, S J, et al., "Carbon nanotube devices for future nanoelectronics", Third IEEE Conference on Nanotechnology, Aug. 12-14, 2003, 1(2), (Aug. 2003), 236-239.

Wind, S S, et al., "Fabrication and electrical characterization of top gate single-wall carbon nanotube field-effect transistors", Journal of Vacuum Science and Technology B: Microelectronics and Nanometer Structures, 20(6), (Nov. 2002), 2798-2801.

(56) References Cited

OTHER PUBLICATIONS

Yin, M., et al., "Synthesis of Monodisperse Nanocrystals of Manganese Oxide", Journal of the American Chemical Society, 125(34), (May 21, 2003), 10180-10181.

Zhang, Li, et al., "Electrostatic Doping-Induced Phonon Shift of Metallic Single-Wall Carbon Nanotubes", The Journal of Physical Chemistry C, 112 (51), (Dec. 4, 2008), 20118-20122.

Zhang, Li, et al., "Imaging and Raman Spectroscopy of Individual Single-Wall Carbon Nanotubes on a Large Substrate", The Journal of Physical Chemistry C, 111 (30), (Jul. 10, 2007), 11240-11245.

Zhang, Li, et al., "Low-Temperature Raman Spectroscopy of Individual Single-Wall Carbon Nanotubes and Single-Layer Graphene", The Journal of Physical Chemistry C, 112 (36), (Aug. 15, 2008), 13893-13900.

* cited by examiner

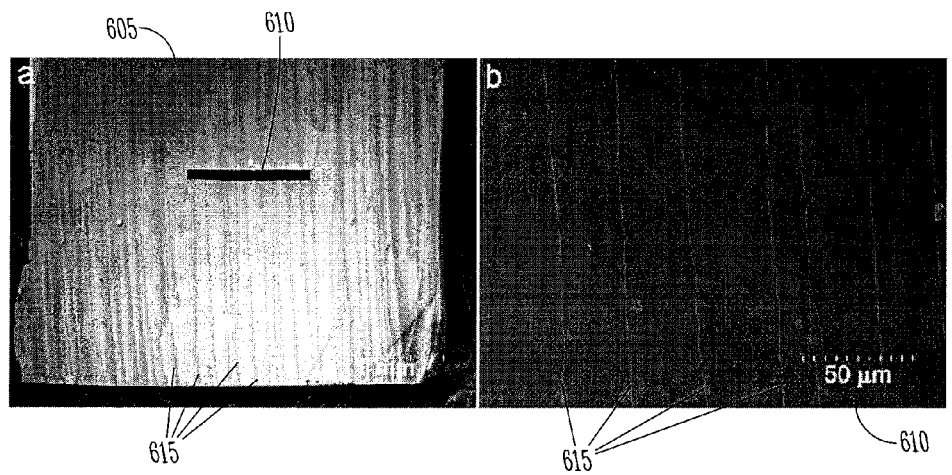
FIG. 6A  FIG. 6B
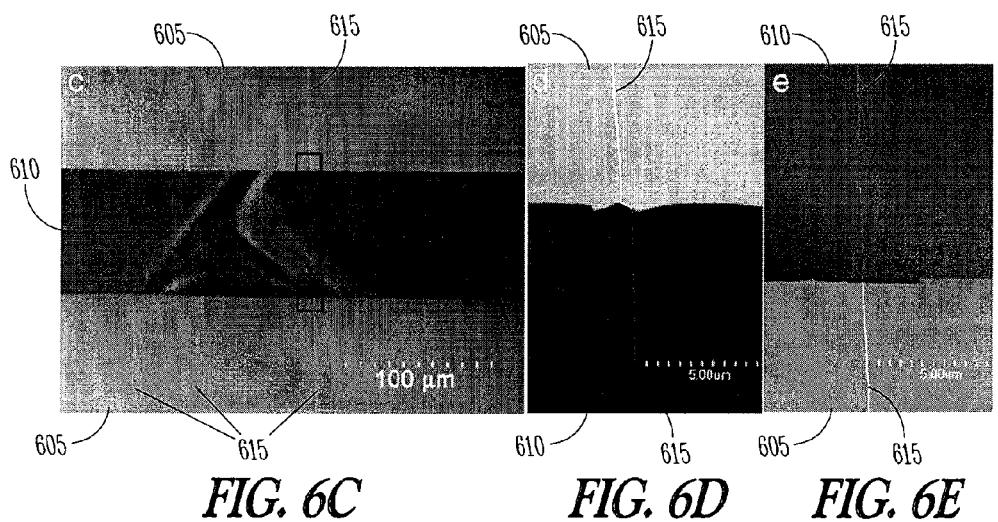
FIG. 6C  FIG. 6D  FIG. 6E

PREPARING NANOPARTICLES AND CARBON NANOTUBES

RELATED APPLICATION

This application is a continuation application of U.S. patent application Ser. No. 12/246,758, filed Oct. 7, 2008, which application is a continuation-in-part from PCT application PCT/US2007/008389, filed Apr. 5, 2007 and published as WO 2007/117503, on Oct. 18, 2007, which claims the benefit of U.S. Provisional Application Ser. No. 60/790,385 filed Apr. 7, 2006, which applications and publication are incorporated herein by reference in their entireties.

GOVERNMENT INTEREST STATEMENT

This invention was made with government support under CHE-0117752 awarded by the National Science Foundation. The government has certain rights in this invention.

All patents, patent applications, and publications cited herein are hereby incorporated by reference in their entirety.

COPYRIGHT

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

TECHNICAL FIELD

The technical field relates to nanoparticles and carbon nanotubes.

BACKGROUND

Single-walled carbon nanotubes include one-dimensional nanometer-diameter molecular wires that can have unique electrical, mechanical, electro-optical and electromechanical properties. As such, these nanotubes show promise as potential building blocks for nanoscale electronic devices, such as field emitting devices, field-effect-transistors, single-electron-transistors, molecular sensors, and the like.

BRIEF DESCRIPTION OF THE DRAWINGS

Embodiments are illustrated by way of example and not limitation in the figures of the accompanying drawings.

FIGS. 6A-6E show examples of SEM images of a parallel array of single-walled carbon nanotubes growing across a Si chip having a slit in its surface.

DETAILED DESCRIPTION

Figure 1:
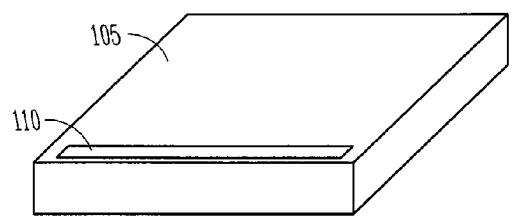
FIG. 1 depicts an example of a substrate on which a layer of material has been deposited.

This document describes, among other things, catalyst nanoparticles from which carbon nanotubes can be generated, such as by using methods described herein.

Single-walled carbon nanotube based-devices can be prepared by deposition of a nanotube suspension on substrates, or via chemical vapor deposition (CVD) growth of individual nanotubes directly on substrates. The direct chemical vapor deposition growth method typically provides individual nanotubes with few structural defects, while the preparation of nanotube based-devices via deposition of a nanotube suspension on substrates usually results in nanotubes that exist in bundles or single nanotubes of submicron lengths and that can have defects arising from post-synthetic destructive treatments. As such, the preparation of single-walled carbon nanotubes using the chemical vapor deposition growth method may be selected over the nanotube suspension method and would appear to be a method of choice for large-scale fabrication of single-walled carbon nanotubes. However, the chemical vapor deposition growth method typically provides nanotubes having varying amounts of amorphous carbon impurities. Further, in the absence of external guidance methods, the chemical vapor deposition growth method typically yields short and randomly oriented nanotubes. For the purposes of fundamental study or device fabrication, it can be desirable to develop methods for making high-purity single-walled carbon nanotubes which allow for control over diameter, helicity, orientation and length.

Certain methods for the surface growth of single-walled carbon nanotubes provide a slight degree of control over the diameter and orientation of the nanotubes being produced. A correlation exists between the size of the catalyst nanoparticles used and the diameter of the nanotubes that are produced. As such, some control over the diameter of growing nanotubes can be realized by depositing uniform and monodisperse catalyst nanoparticles on substrates. In addition, some degree of control over the orientation of growing nanotubes can be achieved via the use of an external electric field during a chemical vapor deposition process, and this alignment effect is believed to originate from the high polarizability of the nanotubes. However, neither fabricating a microelectrode array nor introducing a strong electric field during the chemical vapor deposition growth is trivial, especially when the effort is directed toward large-scale fabrication. A fast heating process can allow the growth of long (mm in length) and well-oriented single-walled carbon nanotubes by chemical vapor deposition using carbon monoxide as a carbon feedstock.

The present inventors have recognized a need in the art for methods of making high-purity single-walled carbon nanotubes, for example, that allow a higher degree of control over various physical parameters of the nanotubes as they are made.

Accordingly, in an embodiment of the present subject matter, nanoparticles can be formed on a substrate by depositing a film of a material on at least a portion of a substrate and heating at least the deposited material and forming separated nanoparticles from the deposited material on the substrate.

FIG. 1 depicts an example of a substrate 105 on which a layer 110 of material has been deposited. Layer 110 can be formed as a thin layer on substrate 105. The thickness of layer 110, vertically from the horizontal surface of substrate 105 can be equal to or less than about 5.0 nanometers. In an embodiment, the thickness of layer 110 can be equal to or less than about 1.0 nanometer. The thickness of layer 110 can be equal to or less than about 0.5 nanometers. Layer 110 can have a linewidth ranging from about 1.0 millimeter to about 5.0 millimeters. The material deposited can include one or more metals or alloys of metals, such as, but not limited to, nickel, iron, cobalt, copper, gold, an alloy of cobalt and molybdenum, an alloy of iron and molybdenum, an alloy of nickel and molybdenum, other alloys, or one or more combinations thereof.

Figure 2:
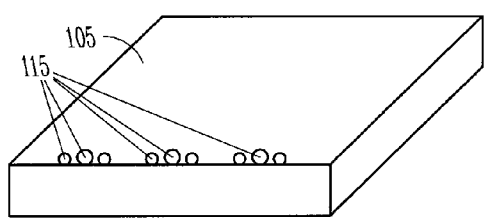
FIG. 2 depicts an example of the substrate of FIG. 1 after heating at least the layer of deposited material and forming nanoparticles on the substrate.

FIG. 2 depicts an example of a substrate 105 after heating at least the deposited material and forming nanoparticles 115 on substrate 105. The layer 110 of deposited material can be heated to a temperature that is at or above 750° C. Other processing temperatures can be used. Nanoparticles 115 can be separated from each other on the surface of substrate. The relative diameters of the nanoparticles 115 can be distributed over a range of effective diameters. The effective diameters can be limited by limiting the thickness of layer 110 deposited on substrate 105. In an embodiment, an effective diameter can range from 0.1 nanometers to 100 nanometers. An effective diameter can be in a range from 1 nanometer to 20 nanometers. An effective diameter can be in a range from 1 nanometer to 10 nanometers.

An embodiment provides a method for making metal catalyst nanoparticles, which are useful for making carbon nanotubes. In certain examples, the method includes depositing a metal catalyst film on top of a substrate and heating the substrate and catalyst film thereon for a time and at a temperature sufficient to cause the catalyst film to disperse and form catalyst nanoparticles on top of the substrate.

In an embodiment, at least one carbon nanotube can be constructed from separated nanoparticles on a substrate such as by generating a carbon feedstock gas flow that contacts one or more of the nanoparticles. The carbon nanotube can be formed in a direction parallel with the carbon feedstock gas flow. In an embodiment, the carbon nanotube can be formed as a single-walled carbon nanotube. The carbon nanotube can be formed as a single-walled carbon nanotube. In an embodiment, the carbon nanotube can be formed as a structure that is free of amorphous carbon.

Figure 3:
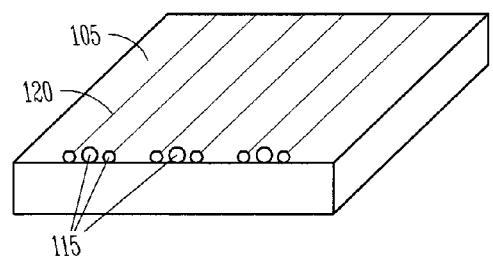
FIG. 3 depicts an example of a carbon nanotube generated from a nanoparticle such as a nanoparticle on substrate shown in FIG. 2.

FIG. 3 depicts an example of a carbon nanotube 120 generated from a nanoparticles such as a nanoparticle 115 on substrate 105 shown in FIG. 2. In various embodiments, carbon nanotube 120 can be formed at a temperature ranging from 350° C. to 1000° C. In an embodiment, carbon nanotube 120 can be formed at a temperature of about 850° C. A carbon feedstock gas flow used to form carbon nanotube 120 can be regulated to control a length of the carbon nanotube formed. In an embodiment, the carbon feedstock gas flow can be regulated in a flow range from 20 standard cubic centimeters per minute (sccm) to 300 sccm. In an embodiment, the carbon nanotube can be constructed with a length ranging from about 500 micrometers to about 5 centimeters. The length of a carbon nanotube can range from about 1 millimeter to about 1 centimeter. The length of a carbon nanotube can range from about 10 millimeters to about 500 millimeters.

In various embodiments, the effective diameter of the formed carbon nanotube can depend on the effective diameter of the nanoparticle from which it is generated. In various embodiments, the effective diameter of the formed carbon nanotube can be determined by the thickness of the film of material deposited to form the nanoparticle from which the carbon nanotube is generated. In an embodiment, the carbon nanotube can be constructed with an effective diameter ranging from about 0.5 nanometers to about 3 nanometers. The effective diameter can range from about 0.3 nanometers to about 4 nanometers. The effective diameter can range from about 0.8 nanometers to about 1.8 nanometers. The effective diameter can range from about 1.0 nanometer to about 1.3 nanometers. The effective diameter can be less than 1.0 nanometer.

In an embodiment, a method provides for making a single-walled carbon nanotube. The method can include depositing a metal catalyst film on top of a substrate, heating the substrate and catalyst film thereon for a time and at a temperature sufficient to cause the catalyst film to disperse and form catalyst nanoparticles on top of the substrate, and carrying out a chemical vapor deposition process comprising contacting a catalyst nanoparticle, formed by the heating process, with a flow of carbon feedstock gas for a time and at a temperature sufficient to make a single-walled carbon nanotube.

Various embodiments that provide methods useful for making metal catalyst nanoparticles and various embodiments that provide methods of using the catalyst nanoparticles to make single-walled carbon nanotubes can provide structures suitable for implementation in a variety of applications. Various embodiments allow for the scalable preparation of long, well-defined nanotubes having improved size uniformity. Cheap carbon feedstock sources can be used. The carbon feedstock sources can be diluted with water and result in nanotubes having increased purity by reducing the amount of amorphous carbon present in the nanotubes as they are formed. Embodiments can provide long, ordered nanotubes without the use of an external electrical field or a "fast heating" process.

Various embodiments of the present methods for making single-walled carbon nanotubes use metal catalyst nanoparticles for nanotube growth. In certain examples, the catalyst is first deposited on top of the substrate as a metal film, and then the substrate having the catalyst film on its surface is preheated before beginning a chemical vapor deposition process. The preheating is generally conducted for a time and at a temperature sufficient to cause the metal catalyst film to disperse into individual metal catalyst nanoparticles on top of the substrate. Accordingly, an embodiment includes a method for making metal catalyst nanoparticles, where the method includes depositing a metal catalyst film on top of a substrate, and heating the substrate and catalyst film thereon for a time and at a temperature sufficient to cause the catalyst film to disperse and form catalyst nanoparticles on top of the substrate.

In an embodiment, the heating takes place in a quartz or other furnace. The heating can take place in an argon or other inert gas atmosphere. In an embodiment, the heating can take place in an atmosphere that includes an inert gas and a second gas, which can be an inert gas or a non-inert gas, such as hydrogen, oxygen or nitrogen. In an embodiment, the second gas is hydrogen. In an embodiment, the heating can take place in atmosphere comprising an inert gas and hydrogen. In an embodiment, the heating can take place in atmosphere comprising argon and hydrogen. In an embodiment, the heating can take place in atmosphere comprising argon and hydrogen in a ratio of about 10 to about 1 by volume, respectively.

In an embodiment, the flow rate into the furnace of: (1) the inert gas or (2) mixture of an inert gas and a second gas, is from about 40 sccm to about 800 sccm. In an embodiment, the flow rate is from about 200 sccm to about 500 sccm. In an embodiment, the flow rate is about 50 sccm. In an embodiment, the flow rate is about 700 sccm.

In an embodiment, the heating takes place for a period of from about 10 minutes to about one hour before beginning the chemical vapor deposition process. In an embodiment, the heating results in a final temperature of from about 500° to about 950° C. In an embodiment, the heating results in a final temperature of from about 700° C. to about 900° C. In an embodiment, the heating results in a final temperature of about 850° C.

In an embodiment, the resultant catalyst nanoparticles have a diameter of from about 1 nm to about 20 nm. In an embodiment, the catalyst nanoparticles have a diameter of from about 0.5 nm to about 10 nm. Metals useful as catalysts in embodiments of the present methods include, but are not limited to, one or any alloy or other combination of nickel, iron, cobalt, alloy of cobalt and platinum, alloy of iron and platinum, alloy of cobalt and molybdenum, alloy of iron and molybdenum, alloy of nickel and molybdenum, copper, and gold. In an embodiment, the catalyst is cobalt. In an embodiment, the catalyst is iron. In an embodiment, the catalyst is copper.

The catalyst film can be deposited onto the substrate using any suitable method for metal deposition, including but not limited to, thermal deposition, a vapor deposition technique, such as chemical vapor deposition, plasma-enhanced chemical vapor deposition, laser-assisted chemical vapor deposition, or physical vapor deposition; laser-assisted chemical liquid phase deposition; plasma spray deposition; atomic layer deposition; sputtering; electroless deposition; and vacuum deposition techniques such as electron-beam evaporation, filament evaporation, flash evaporation or induction evaporation. Other examples of metal deposition methods that can be useful in the present methods include those disclosed in Seshan, K. (Ed.) *Handbook of Thin-Film Deposition Processes and Techniques—Principles, Methods, Equipment and Applications* (2nd Edition) 2002; William Andrew Publishing/Noyes. In an embodiment, the metal catalyst film is deposited on top of the substrate using electron beam evaporation. In an embodiment, the metal catalyst film is deposited on top of the substrate using sputtering.

In an embodiment, the metal catalyst film has a thickness of from about 0.1 nm to about 10.0 nm. In various embodiments, the catalyst film has a thickness of about 0.1 nm, about 0.2 nm, about 0.3 nm, about 0.4 nm, about 0.5 nm, about 0.6 nm, about 0.7 nm, about 0.8 nm, about 0.9 nm, about 1.0 nm, about 1.2 nm, about 1.4 nm, about 1.6 nm, about 1.8 nm, about 2.0 nm, about 2.5 nm, about 3.0 nm, about 3.5 nm, about 4.0 nm, about 4.5 nm, about 5.0 nm, about 5.5 nm, about 6.0 nm, about 6.5 nm, about 7.0 nm, about 8.0 nm, about 8.5 nm, about 9.0 nm, about 9.5 nm, and about 10.0 nm. In an embodiment, the metal catalyst film has a thickness of from about 0.5 nm to about 1.0 nm. In an embodiment, the metal catalyst film has a thickness of about 1.0 nm. In an embodiment, the metal catalyst film has a thickness of about 0.5 nm.

Figure 4:
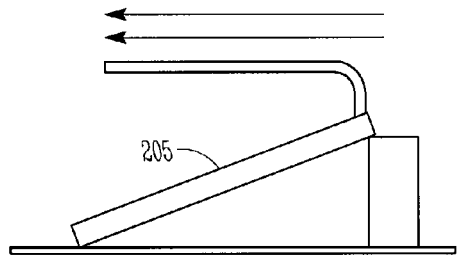
FIG. 4 depicts an example of tilting the substrate to lift up the catalyst edge allowing the carbon nanotube to grow longer.

In an embodiment, the metal catalyst film is deposited along only one side of the substrate surface at a distance of from about 1 mm to about 5 mm from the nearest edge of the substrate. A mask, such as a glass slide having a straight edge, can be used to pattern the metal catalyst film in a desired location on the substrate. Other masks can be used to pattern a metal catalyst film. In this embodiment, the substrate is placed in the reaction furnace such that during the chemical vapor deposition process the carbon feedstock gas flow passes over the catalyst-carrying edge of the substrate first and the resulting carbon nanotubes grow across the substrate surface away from the catalyst-carrying side of the substrate and in the direction of carbon feedstock gas flow. In a variant of this embodiment, the substrate 205 can be tilted such that the catalyst-carrying side of the substrate is raised, such as depicted in FIG. 4. In an embodiment, the substrate is tilted at an angle of from about 5 degrees to about 30 degrees with respect to the floor of the furnace. Without being bound by theory, it is believed that by tilting the substrate to lift up the catalyst edge, the growing nanotube is able to stay suspended in the flow longer before being forced into contact with the substrate by gravity, thus allowing the nanotube to grow longer. Thus, it is believed that tilting the substrate in such a way can result in the formation of longer nanotubes than those obtained when the substrate is in a flat orientation during the chemical vapor deposition process.

Various embodiments of a method for making metal catalyst nanoparticles can be combined with a suitable lithographic technique to pattern the metal catalyst film in various patterns or to provide individual "islands" of metal catalyst film, which can be used to grow individual single-walled carbon nanotubes with precise control over location and orientation. Lithographic techniques useful for patterning the metal catalyst film can include those described, for example, in Giovannella et al., Nanolithography: A Borderland Between Stm, Eb, Ib and X-Ray Lithographies (Nato Science Series E, Applied Sciences) (Hardcover), NATO Advanced Research Workshop on Nanolithography. The metal catalyst thin films can also be patterned with a soft polymer template prepared by solution-based self-assembling of diblock copolymer. See, for example, K. W. Guarini, C. T. Black and S. H. I. Yeung, *Adv. Mater.* 14, 1290 (2002)].

Various embodiments of the present methods for making single-walled carbon nanotubes use a carbon feedstock that includes a carbon-containing organic compound and water (collectively referred to herein as the "carbon feedstock"). Suitable carbon-containing organic compounds useful as components of the carbon feedstock include, but are not limited to an organic alcohol, such as methanol, ethanol, n-propanol, isopropanol, n-butanol, isobutanol, sec-butanol or tert-butanol; an aromatic hydrocarbon such as benzene, toluene, or xylene; an aliphatic hydrocarbon, such as methane, ethane, propane, ethylene, propylene or acetylene; and mixtures thereof. Without being bound by theory, it is believed that the addition of water to a carbon feedstock can enhance the activity of the catalyst and efficiently remove amorphous carbon formed during a chemical vapor deposition process.

In various embodiments, the carbon feedstock comprises about 5% water, about 10% water, about 20% water, about 30% water, about 40% water, about 50% water, about 60% water, about 70% water, about 80% water, or about 90% water by volume. In a particular embodiment, the carbon feedstock comprises about 5% water. In an embodiment, the carbon feedstock includes an aqueous organic alcohol. The carbon feedstock can include aqueous methanol or aqueous ethanol. The carbon feedstock can include aqueous ethanol. In an embodiment, the carbon feedstock can be about 95% aqueous ethanol (e.g., about 95% ethanol and about 5% water). In an embodiment, when the carbon feedstock comprises an organic alcohol, the carbon feedstock further comprises a doping agent, including but not limited to acetonitrile or ammonia. In various embodiments, doping agents in a carbon feedstock can include thiophen.

The carbon feedstock can be delivered in vapor form to the site of the carbon vapor deposition process using a flow of carrier gas or by vacuum. In an embodiment, a carrier gas is bubbled through a pool of the carbon feedstock and the carrier gas/carbon feedstock gas mixture exiting the pool is directed to the reaction furnace where it contacts one or more catalyst nanoparticles during the carbon vapor deposition process and results in the formation of one or more carbon nanotubes. In an embodiment, the carrier gas comprises an inert gas. The carrier gas can be argon. In an embodiment, the carrier gas further comprises a second gas, which can be an inert gas, such as argon, helium, xenon or neon; or a non-inert gas, such as hydrogen, oxygen or nitrogen. In an embodiment, the second gas is hydrogen. In an embodiment, the carrier gas comprises argon and hydrogen. In an embodiment, the carrier gas consists essentially of argon and hydrogen in a ratio of about 10 to about 1 by volume.

In an embodiment, the flow rate of the carrier gas during the carbon vapor deposition process is from about 40 sccm to about 800 sccm. In an embodiment, the flow rate is from about 200 sccm to about 500 sccm. In an embodiment, the flow rate is about 50 sccm. In an embodiment, the flow rate is about 700 sccm.

In an embodiment, the carbon feedstock gas is delivered to the reaction furnace using a vacuum to pull the feedstock vapor into the reaction furnace. In an embodiment, one or more components of the carbon feedstock are degassed prior to use in the present methods.

In various embodiments, the substrate provides a support surface for the catalyst and a growth platform for the nanotubes made using embodiments of the present methods. Suitable materials for the substrate include but are not limited to, alumina; a silicate; a nitride, such as GaN, InN, AlN or $Si_3N_4$; quartz; single crystal quartz; a semiconducting material such as silicon, germanium, tin, GaAs, InP, SiC or ZnSe; an insulating material such as an acetate, a ceramic, a semimetal material such as carbon, indium tin oxide (ITO); a metal material such as copper, stainless steel, or other appropriate substrate material that is stable at high temperatures for CVD processing. In an embodiment, the substrate has a substantially planar surface. In an embodiment, the substrate is silicon. In an embodiment, the substrate is a flake. In an embodiment, the substrate is a wafer. In an embodiment, the substrate is a Si wafer. In an embodiment, the substrate is a p-type Si wafer.

Various embodiments can further comprise first depositing a layer of material on top of the substrate, then depositing the metal catalyst film on top of the layer of material. The layer of material can be deposited on top of the substrate as a film having a thickness of from about 1.0 nm to about 50 nm, using a deposition method including, but not limited to, atomic layer deposition, molecular beam epitaxy, or thermal evaporation. In an embodiment, the layer of material has a thickness of from about 5 nm to about 15 nm. In an embodiment, the layer of material has a thickness of about 10 nm. Materials useful for such a layer in the present methods include, but are not limited to, $SiO_2$, $Al_2O_3$, $Si_3N_4$, $HfO_2$, $ZrO_2$, or $Hf_xZr_yO_2$. Other high-K dielectric materials (materials with a dielectric constant greater than that of silicon dioxide) can be used. In an embodiment, the layer of material includes an epitaxial layer ("epilayer"). In an embodiment, the epilayer comprises $Al_2O_3$. In an embodiment, the epilayer comprises $Si_3N_4$.

In an embodiment, a cobalt catalyst is deposited over an $Al_2O_3$ epilayer. In an embodiment, a cobalt catalyst is deposited over a $Si_3N_4$ epilayer.

In various embodiments, a catalyst can be deposited on a substrate as a film over a structure having multiple layers of material disposed on the substrate. In an embodiment, the substrate can have a first and second epilayer, wherein the first epilayer is deposited directly on top of the substrate and the second epilayer is deposited directly on top of the first epilayer. The catalyst can then be deposited as a film over the second epilayer. In an embodiment, a substrate has a first epilayer comprising $Si_3N_4$ and a second layer comprising $Al_2O_3$. In an embodiment, a substrate has a first epilayer comprising $Si_3N_4$, a second layer comprising $Al_2O_3$, and a cobalt catalyst deposited over the second epilayer.

A substrate having one or more epilayers can be fabricated to have one or more slits on its surface. In an embodiment, a substrate having one or more slits on its surface can be made using photolithography, followed by depositing the catalyst as a film to the surface of the substrate. A slit can have a length of from about 1 mm to about 5 mm. In certain embodiments a slit has a length of about 1 mm, about 2 mm, about 3 mm, about 4 mm and about 5 mm. A slit can have a width of from about 10 µm to about 200 µm. In an embodiment, a slit has a width of from about 20 µm to about 100 µm. In certain embodiments a slit has a width of about 20 µm, about 30 µm, about 40 µm, about 50 µM, about 60 µm, about 70 µm, about 80 µm, about 90 µm and about 100 µm. Besides a slit structure, carbon nanotubes can also grow freely over other surface features, like surface trenches, or vertical barriers, due to the fact that the carbon nanotubes can lift off without interactions with the surface during the chemical vapor deposition.

In an embodiment, the one or more slits can be formed by applying an epilayer as a film to the surface of the substrate, then using standard bulk micromachining to etch from the back of the substrate (the side of the substrate opposite the side having the epilayer) and provide one or more long, thin membranes on top of the substrate having the epilayer. The one or more membranes can then removed using, for example, an ultrasonic bath to create one or more slits in the top surface of the substrate.

In an embodiment, one or more slits are made on a substrate prior to depositing the catalyst on top of the substrate. In an embodiment, an epilayer comprising $Si_3N_4$ is deposited onto a substrate before slit formation. In an embodiment, one or more slits are made on a substrate after depositing the catalyst on top of the substrate.

When used in embodiments of the present methods, a substrate having one or more slits can provide parallel and straight arrays of single-walled carbon nanotubes. In an embodiment, a substrate having one or more slits is positioned so the slit axis is perpendicular to the direction of carbon feedstock gas flow during the chemical vapor deposition process.

Embodiments of the present methods can provide methods for making a single-walled carbon nanotube. In certain examples, such a method includes depositing a metal catalyst film on top of a substrate, heating the substrate and catalyst film thereon for a time and at a temperature sufficient to cause the catalyst film to disperse and form catalyst nanoparticles on top of the substrate, and carrying out a chemical vapor deposition process comprising contacting a catalyst nanoparticle, formed in the heating process, with a flow of carbon feedstock gas for a time and at a temperature sufficient to make a single-walled carbon nanotube. In an embodiment, the chemical vapor deposition process is carried out in a quartz or other furnace.

In an embodiment, the chemical vapor deposition process can be carried out at temperature of from about 500° C. to about 950° C. The chemical vapor deposition process can be carried out at a temperature of from about 700° C. to about 900° C. The chemical vapor deposition process can be carried out at a temperature of about 850° C.

In an embodiment, the chemical vapor deposition process is carried out for a time of from about 1 minute to about 2 hours. The chemical vapor deposition process can be carried out for a time of from about 10 minutes to about 90 minutes. The chemical vapor deposition process is carried out for a time of from about 20 minutes to about 60 minutes. In an embodiment, the chemical vapor deposition process can be carried out for a time of from about 20 minutes to about 30 minutes. The chemical vapor deposition process can be carried out for a time of about 60 minutes. In an embodiment, the chemical vapor deposition process can be carried out at a temperature of about 850° C. for a time of about 60 minutes.

In an embodiment, horizontally aligned single-walled carbon nanotubes can be grown directly on a substrate surface or, in an embodiment, across slits that are present on top of the substrate. Various embodiments of the present methods can afford parallel and straight nanotube arrays grown across slits without the need for guidance from strong electric fields. In an embodiment, the orientation of a single-walled carbon nanotube produced can be parallel to the direction of the carbon feedstock gas flow. In an embodiment, parallel arrays of single-walled carbon nanotubes can be fabricated. In an embodiment, the single-walled carbon nanotubes made using the present methods are individual single-walled carbon nanotubes. In various embodiments, two-dimensional networks of single-walled carbon nanotubes can be fabricated.

In various embodiments, a single-walled carbon nanotube can be constructed having a diameter of from about 0.3 nm to about 4 nm. A single-walled carbon nanotube can be constructed having a diameter of from about 0.5 nm to about 3 nm. A single-walled carbon nanotube can be constructed having a diameter of from about 1.0 nm to about 2.0 nm.

In various embodiments, a single-walled carbon nanotube having a designed length can be constructed. A single-walled carbon nanotube can be constructed having a length of from about 1 nm to about 100 cm. A single-walled carbon nanotube can be constructed having a length of from about 1 mm to about 10 cm. A single-walled carbon nanotube can be constructed having a length of from about 10 mm to about 500 mm. A single-walled carbon nanotube can be constructed having a length of from about 100 mm to about 300 mm.

In an embodiment, the flow rate of the carrier gas/carbon feedstock gas mixture during the carbon vapor deposition process is from about 40 sccm to about 800 sccm. A flow rate from about 200 sccm to about 500 sccm can be used. A flow rate of about 50 sccm can be used. A flow rate of about 700 sccm can be used.

In an embodiment, the carbon feedstock is about 95% aqueous ethanol and the carrier gas consists essentially of argon and hydrogen. A carbon feedstock can be used that is about 95% aqueous ethanol and the carrier gas consists essentially of argon and hydrogen, wherein the ratio of argon to hydrogen is about 10 to about 1 by volume.

A non-limiting illustrative general procedure for practicing embodiments of the method is provided in the following. A metal catalyst film is first deposited on a substrate using an appropriate metal deposition method. The substrate is then placed in the middle of a furnace that is at room temperature. A flow of an inert gas or a gas mixture comprising an inert gas is then introduced into the furnace and the furnace is gradually heated for a time and at a temperature sufficient to convert the catalyst film into catalyst nanoparticles.

Carbon feedstock is then delivered to the furnace such as by bubbling the carrier gas through a pool of the carbon feedstock, where it becomes enriched with feedstock vapor. The feedstock-enriched carrier gas then exits the pool and transports the feedstock vapor to the furnace, wherein a chemical vapor deposition process is carried out for a time and at a temperature sufficient to make one or more single-walled carbon nanotubes.

The dimensions of single-walled carbon nanotubes made using embodiments of the present methods can be measured using Atomic Force Microscopy (AFM) and Raman Scattering Spectroscopy. The diameters of the single-walled carbon nanotubes that are made using embodiments of the present methods can be measured using a resonant Raman spectra in which a particular radial breathing mode (RBM) peak corresponds to a specific nanotube diameter.

Single-walled carbon nanotubes made using embodiments of the present methods can be useful in numerous applications, including, but not limited to, as components of nanoelectronic devices such as FETS, sensors, optoelectronic devices, transparent and conductive nanotube films for displays, or solar cells; making electrical connections in integrated circuits or semiconductor chips; as probes in scanning tunneling microscopes; as components of scanning probe microscopes and atomic force microscopes; as field emitters of electrons for electronic applications; as antennas; and as supports for catalysts used in chemical processes. In addition, the single-walled carbon nanotubes described herein, either alone or in groups of two or more, can be used in power transmission cables, solar cells, batteries, antennas, or as molecular electronics. Further, the various embodiments of the present methods, which allow for the controlled growth of individual, ultralong carbon nanotubes, can be useful for large-scale fabrication of nanotube-based devices.

The following examples are set forth to assist in understanding the various embodiments and should not, of course, be construed as specifically limiting the invention described and claimed herein. Such variations of the invention, including the substitution of all equivalents now known or later developed, and changes in formulation or minor changes in experimental design, are to be considered to fall within the scope of the invention incorporated herein.

EXAMPLES

General Procedures

Scanning electron microscopy (SEM) images were obtained using a Hitachi 4700 Field Emission SEM operated at 0.8 kV. Tapping-mold atomic force microscopy (AFM) images were obtained using a Nanoscope IIIa (Digital Instruments), and the nanotube diameters were derived from the corresponding height measurement. Raman scattering was performed using a confocal microscope equipped with a Trix spectrometer. The incident light from a HeNe laser (e.g., 632.8 nm, 1 mW) was focused onto a 0.5 μm spot in diameter on samples. Radial breath mode (RBM) spectra were collected using a liquid-nitrogen cooled CCD camera. An RBM peak ($v_{RBM}$, $cm^{-1}$) corresponds to a specific nanotube diameter (in nm), which can be calculated using the following equation: diameter (nm)=$223.75/(v_{RBM}-16)$. The purity of the carbon nanotubes made using the catalysts and embodiments of the present methods can be determined using transmission electron microscopy (TEM).

Example 1

Single-Walled Carbon Nanotubes Made Using Cobalt Catalyst and Ethanol Feedstock

Using atomic layer deposition (e.g., Savannah 200 ALD instrument from Cambridge Nanotech Inc.), an $Al_2O_3$ layer having a thickness of 10 nm was deposited onto a $SiO_2$ (e.g., 400 nm)/Si substrate (about 1.5 cm in length). A cobalt film (e.g., 0.5 nm thick) was then deposited over the $Al_2O_3$ epilayer using an electron beam evaporator (e.g., SEMICORE SC2000 E-beam evaporation system) such as at a deposition rate of 0.1 A/s. A glass slide was used as a mask such that the cobalt film was only deposited along one side of the substrate, about 0.5 mm from the edge of the substrate.

The substrate was then placed in quartz tube furnace (e.g., 25 mm o.d, 22 mm i.d.) and a flow of argon:hydrogen (e.g., 10:1 v/v) carrier gas was introduced into the furnace, such as at a flow rate of 400 sccm with gas flow parallel to the nanotube direction. The furnace was gradually heated to 850° C. over one hour, then 95% ethanol vapor was delivered to furnace, such as by bubbling the carrier gas into an ethanol-water bubbler (e.g., water level at 5% by volume; water and ethanol were degassed prior to use) such as at a flow rate of 50 sccm for 30 minutes to provide single-walled carbon nanotubes, which were shown to have lengths of up to 5 cm and diameters ranging from 1.0 to 2.0 nm.

Figure 5A:
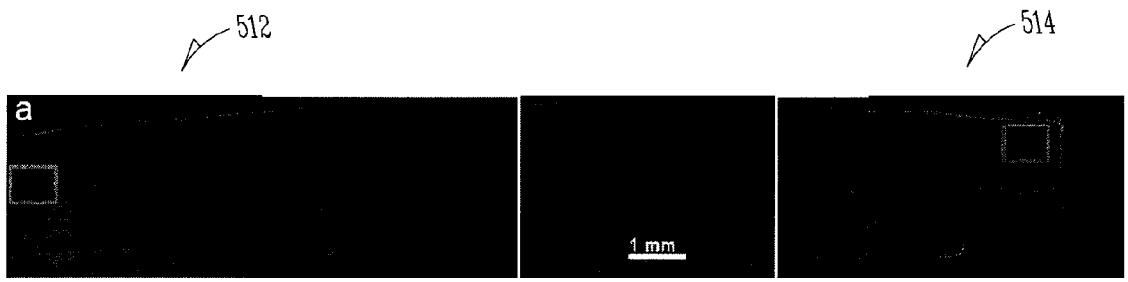
FIGS. 5A-5C show examples of SEM images of single-walled carbon nanotubes that were made using an example disclosed herein.
Figure 5B:
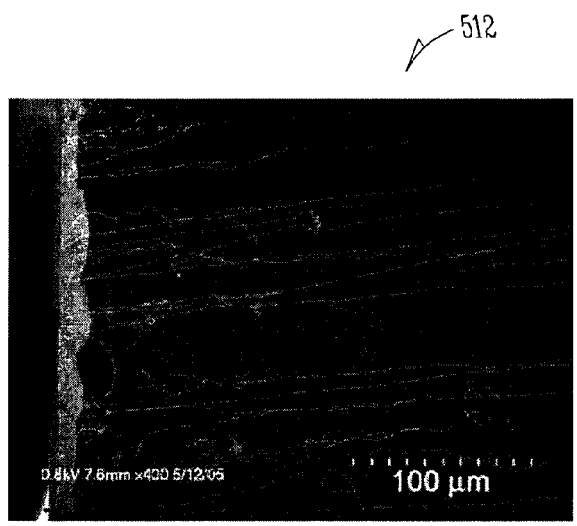
Figure 5C:
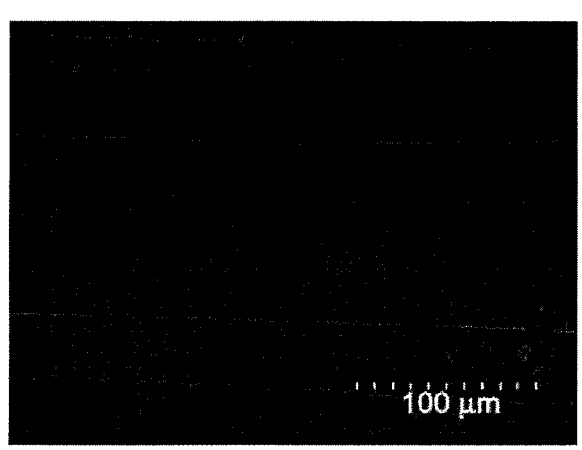

FIGS. 5A-5C show SEM images of single-walled carbon nanotubes that were made using the example method described in Example 1. The nanotubes appear as semi-parallel lines over a darker background. FIG. 5A shows SEM images of well-aligned arrays of single-walled carbon nanotubes growing from on a $SiO_2$ (e.g., 400 nm)/Si substrate (e.g., about 1.5 cm in length) onto the left-hand edge 512 of which has been deposited a cobalt catalyst and using 95% ethanol as carbon feedstock. The carbon nanotubes grow from left-hand edge 512 to the right-hand edge 514. FIG. 5B shows a higher magnification image of the growing nanotubes at left-hand edge 512 depicted in FIG. 5A. Long individual nanotubes are seen growing almost parallel from the catalyst nanoparticles across the substrate in the direction of the feedstock gas flow. FIG. 5C shows a higher magnification image of the growing nanotubes at right-hand edge 514 depicted in FIG. 5A.

Example 2

Single-Walled Carbon Nanotubes Made Using Cobalt Catalyst and Ethanol Feedstock and a Substrate Containing a Slit Silicon chips (~4×4 mm) with a slit structure were prepared from a Si wafer with a $Si_3N_4$ epilayer. The slits (approximately 100 mm wide×1 mm long) were fabricated by anisotropic KOH etching of Si using the $Si_3N_4$ layer as a mask. The Si chips with the slit structures on elevated stages (~20 micrometers high) were also fabricated using a standard photolithography and wet etching process. Ultrathin films (~1 nm in thickness) of Co were deposited on the edge of chips (e.g., <0.5 mm away from the edge) by using an e-beam evaporator (e.g., SEMICORE SC2000 E-beam Evaporation System) with a deposition rate of 0.01 nm/s. The chips were placed in a CVD reactor (e.g., a 25 mm (o.d.)/22 mm (i.d.) quartz tube) with the slit perpendicular to the gas flow so that long nanotubes can be carried downstream over the slit. The cobalt catalyst film was gradually heated to 850° C. in an argon/$H_2$ (e.g., 520 sccm/65 sccm) flow for 1 h before ethanol was introduced for the nanotube growth. The ethanol and water vapor was delivered by bubbling argon/$H_2$ mixed gas (e.g., 10:1 by volume, 80-700 sccm) into an ethanol pool (0° C.), and the ethanol CVD was carried out at 850° C. for 20-80 min. The results show that millimeter to centimeter-long, oriented single-walled carbon nanotubes can traverse slits as large as hundreds of microns wide or grow over vertical barriers as high as 20 micrometers. These example results indicate that well oriented nanotube arrays can be grown across slits using embodiments of the present methods.

FIGS. 6A-6E show SEM images of a parallel array of single-walled carbon nanotubes growing across a Si chip 605 having a slit 610 in its surface in the center of the chip. Suspended single-walled carbon nanotubes grow across slit 610. FIG. 6A shows a lower magnification view of nanotubes 615 growing across chip 605 and over slit 610. FIG. 6B shows a higher magnification image of nanotubes 615 growing across slit 610. FIG. 6D and FIG. 6E show higher magnification images of the two highlighted boxes in FIG. 6C and depict nanotubes 615 as they cross both edges of slit 610.

Figure 7A:
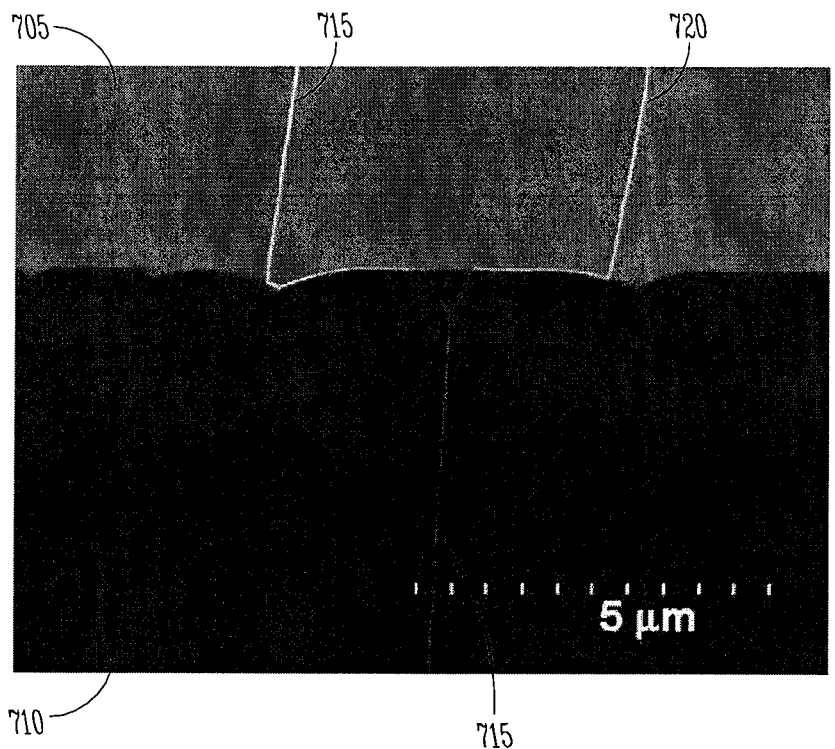
FIGS. 7A-7B show examples of SEM images of individual carbon nanotubes as grown toward and across a slit.
Figure 7B:
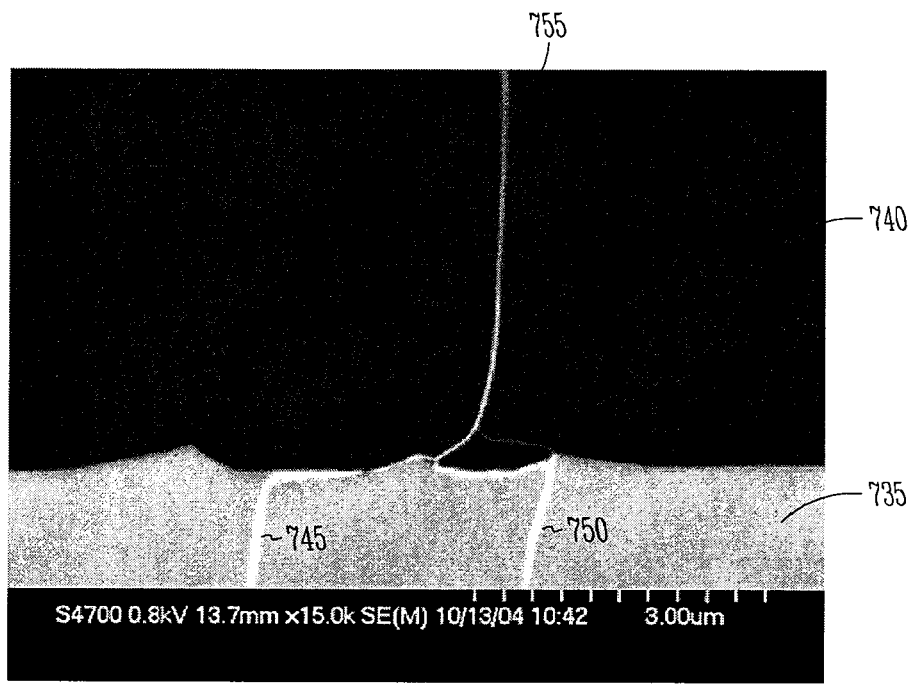

FIGS. 7A-7B show SEM images of individual carbon nanotubes as grow toward and across a slit. FIG. 7A shows two individual nanotubes 715 and 720 growing over a substrate 705 and over a slit 710, whereupon the two nanotubes 715 and 720 combine to form a small bundle 725 over slit 710. FIG. 7B shows two individual nanotubes 745 and 750 as they grow over a substrate 735, continue their growth along the edge of a slit 740 and finally into the space above the slit 740, where the two nanotubes 745 and 750 combine to form a small bundle 755 over slit 740.

Figure 8A:
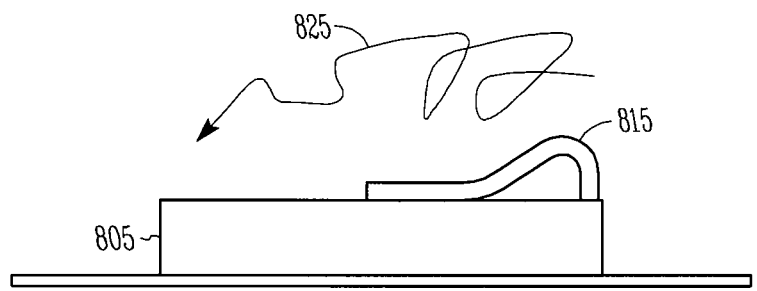
FIGS. 8A-8C show examples of schematics depicting possible mechanisms of chemical vapor deposition nanotube growth.
Figure 8B:
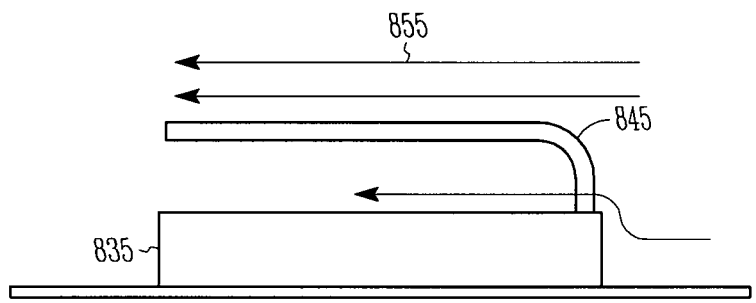
Figure 8C:
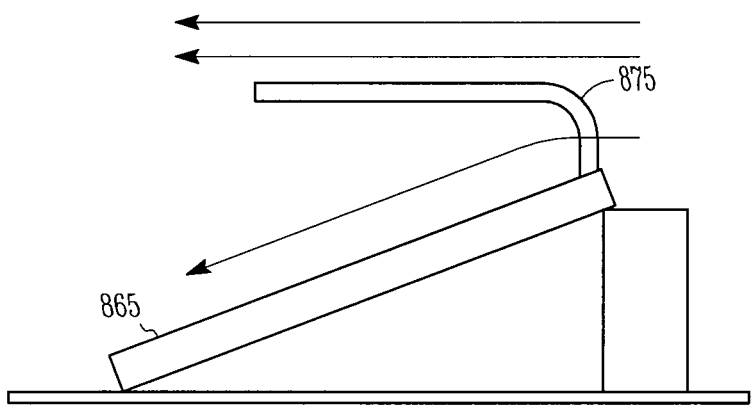

FIGS. 8A-8C show schematics depicting possible mechanisms of chemical vapor deposition nanotube growth. FIG. 8A depicts a carbon nanotube 815 that first grows upward from a substrate 805 and then gets caught in a turbulent flow 825 of carbon feedstock gas, resulting in the direction of growth being redirected downward, causing the growing nanotube to crash on the substrate surface. FIG. 8B depicts a carbon nanotube 845 that first grows upward from a substrate 835 and then gets caught in an ordered laminar flow 855 of carbon feedstock gas which allows the nanotube to steadily grow in the direction of the flow until gravity causes the growing nanotube to contact the substrate surface. FIG. 8c depicts how, by tilting a substrate 865 to lift up the catalyst edge, the growing nanotube 875 is able to stay in the air longer before being forced into contact with substrate 865 by gravity, thus allowing the nanotube to grow longer.

Figure 9:
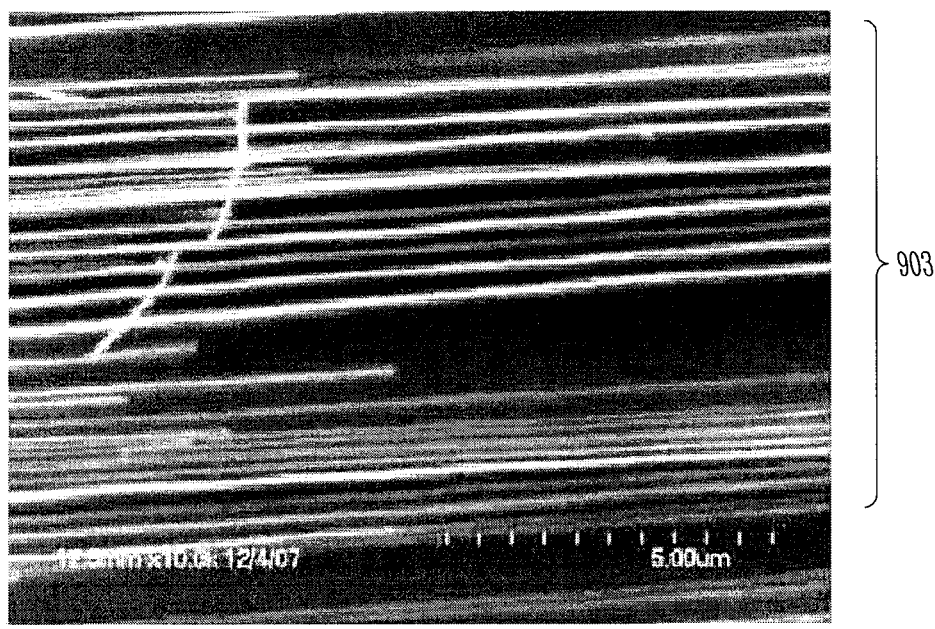
FIG. 9 shows an embodiment of parallel carbon nanotube arrays.

FIG. 9 shows an embodiment of parallel carbon nanotube arrays 903. The parallel carbon nanotubes can be formed on single-crystal quartz substrates. When growing on single-crystal quartz substrates, the carbon nanotube orientation can be directed by ordered lattices of the single crystal to provide parallel carbon nanotube arrays. In various embodiments, the parallel carbon nanotube arrays can have a tube density ranging from 1 nanotube/micron to 5 nanotubes/micron. Other tube densities can be achieved.

Various embodiments described herein relate to metal catalyst nanoparticles, methods for making the catalyst nanoparticles, and methods of using the catalyst nanoparticles to make single-walled and multi-walled carbon nanotubes. Embodiments allow for the preparation of long, well-defined nanotubes having improved size uniformity and purity. Various embodiments provide for improved quality of carbon nanotubes for electronic and optical applications.

The above detailed description refers to the accompanying drawings that show, by way of illustration, various non-limiting embodiments of the present invention. These embodiments can be referred to as examples. Other embodiments can be utilized, and structural, logical, and electrical changes can be made to these embodiments. The various embodiments are not necessarily mutually exclusive, as some embodiments can be combined with one or more other embodiments to form new embodiments. The above detailed description is, therefore, not to be taken in a limiting sense. The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims. Although specific embodiments have been illustrated and described herein, it will be appreciated by those of ordinary skill in the art that any arrangement that is calculated to achieve the same purpose can be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments can be apparent to those of skill in the art upon studying the above description.

What is claimed is:

1. A method for forming catalyst nanoparticles, the method comprising:
   selecting a film thickness of a film of a catalyst material to control for a predetermined effective nanoparticle diameter of the catalyst nanoparticles;
   depositing the film of the catalyst material having the selected film thickness in a pattern on and contacting a substrate wherein the catalyst material is capable of being used for forming non-amorphous carbon nanotubes; and
   heating the deposited catalyst material causing the deposited catalyst material to disperse forming separated catalyst nanoparticles from the deposited material on and contacting the substrate within the pattern, wherein heating the deposited catalyst material causes the formation of the catalyst nanoparticles with substantially uniform dispersity of the effective nanoparticle diameter.

2. The method of claim 1, wherein depositing the catalyst material includes depositing a metal film, in which the metal is selected from one or any alloy or other combination of nickel, iron, cobalt, alloy of cobalt and platinum, alloy of iron and platinum, alloy of cobalt and molybdenum, alloy of iron and molybdenum, alloy of nickel and molybdenum, copper, and gold.

3. The method of claim 1, wherein the predetermined effective nanoparticle diameter of the catalyst nanoparticles in a range from 0.1 nanometers to 100 nanometers.

4. The method of claim 1, wherein depositing the film of the catalyst material includes depositing the film of the catalyst material on and in contact with a dielectric layer of the substrate.

5. The method of claim 1, wherein depositing the film of the catalyst material includes depositing the film of the catalyst material on a substrate that includes one or more of silicon, sapphire, quartz, alumina, a silicate, a nitride, GaN, InN, AlN or $Si_3N_4$, germanium, tin, GaAs, InP, SiC, or ZnSe.

6. The method of claim 1, wherein heating the deposited catalyst material comprises heating the catalyst material in a furnace while feeding a gas comprising an inert gas to the furnace at a flow rate of from about 40 sccm to about 800 sccm.

7. The method of claim 1, wherein heating the deposited catalyst material comprises heating the catalyst material for a period of from about 10 minutes to about 1 hour and to a temperature of from about 500° C. to about 950° C. to form the separated catalyst nanoparticles.

8. The method of claim 1, wherein heating the deposited catalyst material comprises heating the catalyst material to a temperature of from about 700° C. to about 900° C. to form the separated catalyst nanoparticles.

9. The method of claim 1, wherein the film of the catalyst material has a thickness of about 1 nanometer or less.

10. The method of claim 1, wherein the predetermined effective nanoparticle diameter of the catalyst nanoparticles is from about 1 nm to about 20 nm.

11. The method of claim 1, wherein depositing the film of the catalyst material comprises depositing the film along only one side of the substrate proximate an edge of the substrate.

12. The method of claim 1, wherein the substrate comprises a material that is stable at temperatures of from about 500° C. to about 950° C.

13. The method of claim 1, further comprising selecting the predetermined effective nanoparticle diameter of the catalyst nanoparticles to control for a predetermined nanotube diameter of the carbon nanotubes to be formed on the catalyst nanoparticles.

14. The method of claim 1, further comprising forming the non-amorphous carbon nanotubes having the predetermined nanotube diameter of from about 0.3 nanometers to about 4 nanometers.

* * * * *

UNITED STATES PATENT AND TRADEMARK OFFICE
CERTIFICATE OF CORRECTION

PATENT NO. : 9,108,850 B2  
APPLICATION NO. : 13/299875  
DATED : August 18, 2015  
INVENTOR(S) : O'Brien et al.

Page 1 of 1

It is certified that error appears in the above-identified patent and that said Letters Patent is hereby corrected as shown below:

Claims

In column 13, line 23, in Claim 1, after "substrate", insert --,--, therefor

Signed and Sealed this
Tenth Day of May, 2016

Michelle K. Lee
*Director of the United States Patent and Trademark Office*